Patented Mar. 13, 1934

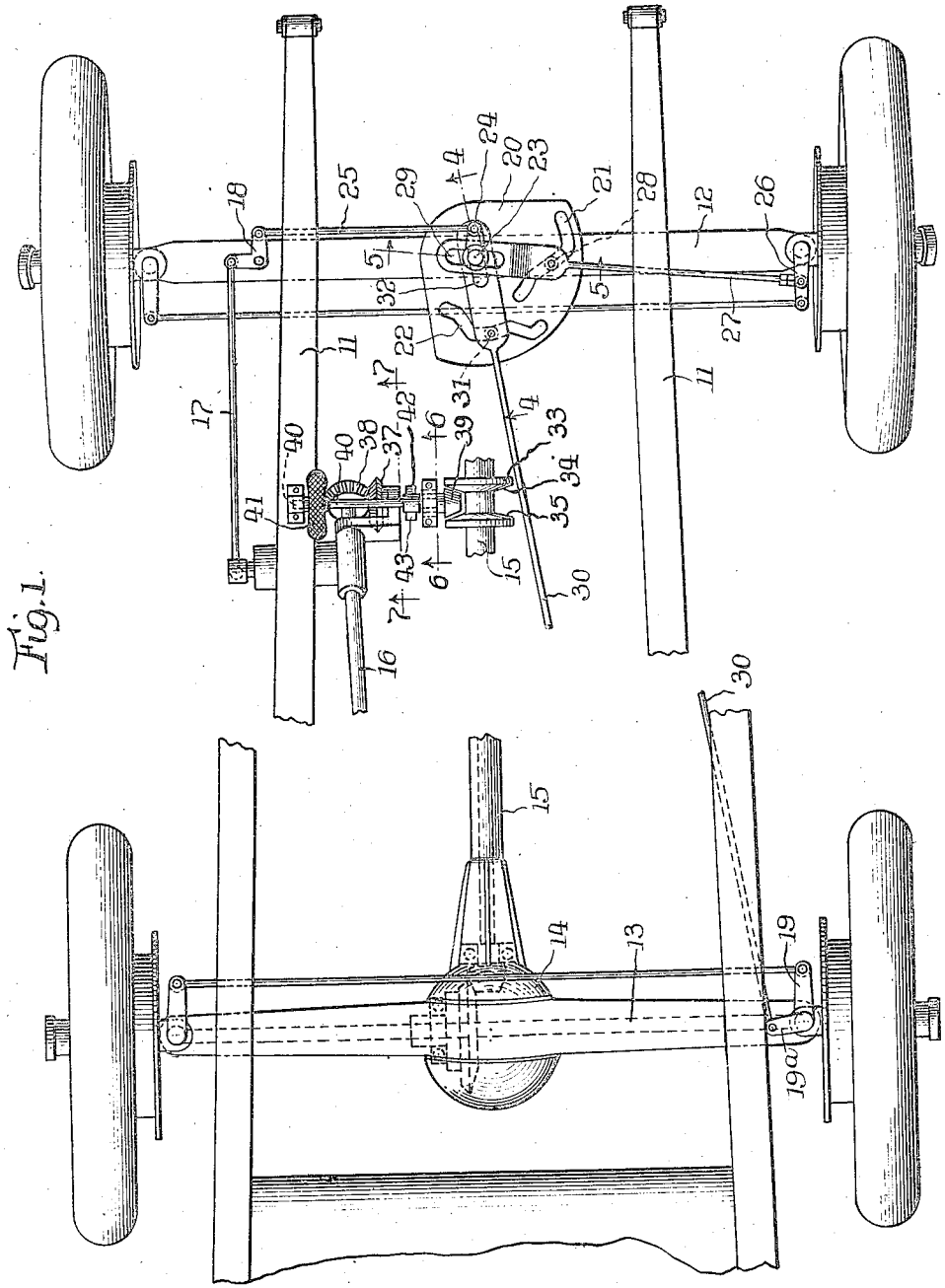

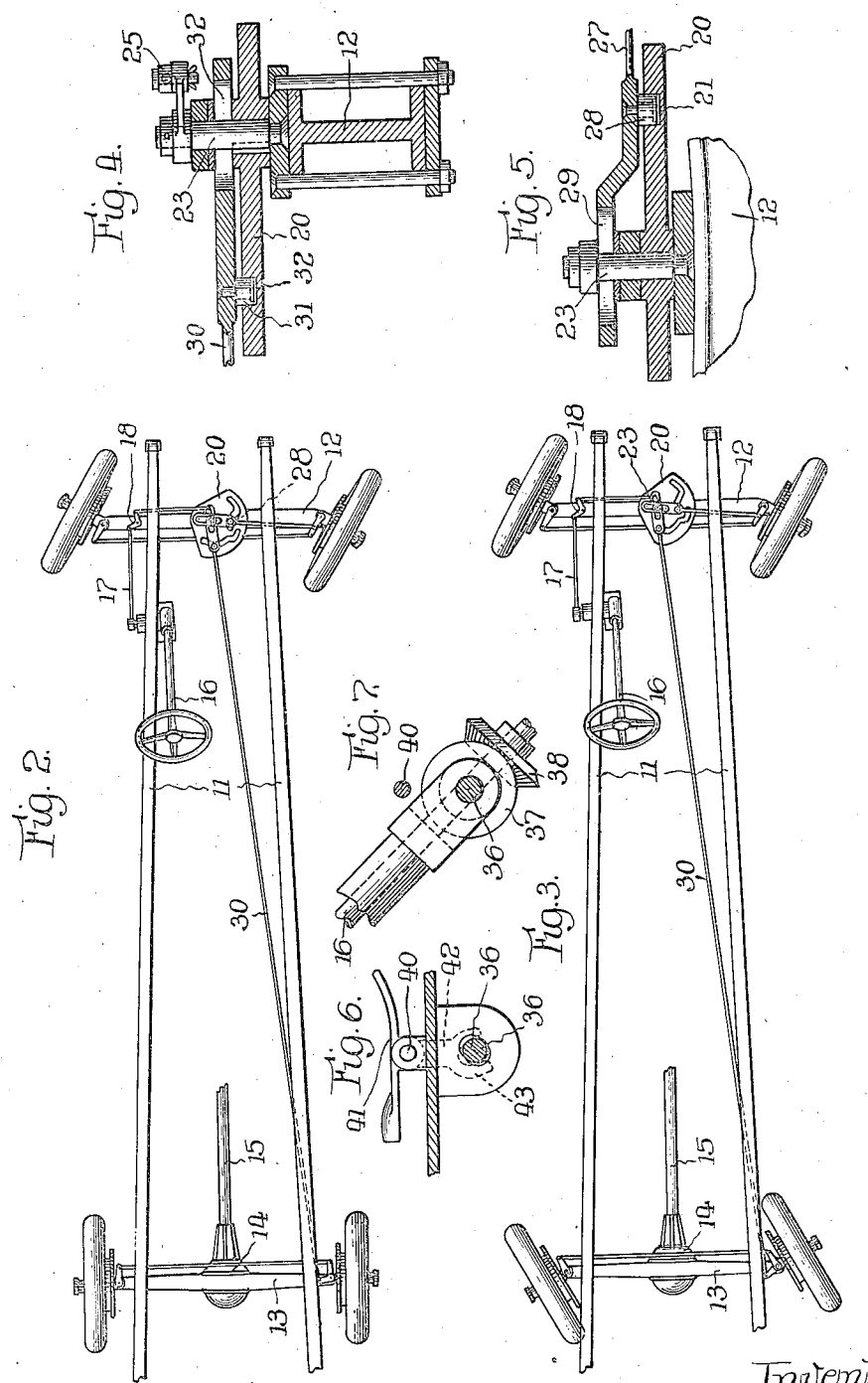

1,951,147

UNITED STATES PATENT OFFICE 1,951,147

STEERING GEAR FOR MOTOR VEHICLES

Lewis T. Greist, Lake Forest, Ill.

Application July 30, 1932, Serial No. 626,432

12 Claims. (Cl. 280—91)

The present and growing tendency in motor vehicle construction, whether large cars for private use or trucks and busses for commercial use, is towards an increased length of wheel base which makes for stability at high speeds, less sensitiveness to inequalities of road surface, consequent ease of riding, and other advantages well recognized by makers and users.

One of the limitations upon the lengthening of the wheel base is the difficulty of turning which increases with the distance between the points of wheel contact with the road.

Certain fire fighting equipment, such as hook and ladder trucks, provide for the independent steering of the rear wheels by an extra operator. It has been proposed in vehicle construction to effect a permanent connection between the front and rear wheels whereby they are simultaneously deflected in oppositely diverging directions from the vehicle axis. It has also been contemplated to effect a turning of the wheels into parallelism at an oblique angle or on diverging lines at the option of the driver by manipulation of a plurality of steering wheels and more or less complicated clutch and coupling mechanism to effect parking or turning.

It is dangerous to place upon drivers, many of whom are not mechanically skilled or qualified by experience, the responsibility of determining in an emergency the proper relative turning movement of the front and rear wheels or the selection of levers, clutches and the like to be manipulated in the particular circumstances.

It is the primary object of the present invention to enable the turning of the long-coupled wheels upon a small radius only where required by the turning space available; the rear wheels partaking of the turning movement only when necessary; the coming into action of the steering mechanism of the rear wheels succeeding rather than being simultaneous with the shifting of the front wheels; the one steering wheel effecting the sequential steering of the front and rear; the deflecting of the rear wheels in the proper degree and at proper times to partake of the steering movement being automatic and effected without thought of the driver and often even without his knowledge; such sequential operation being a function of the one steering wheel whereby turning of the steering wheel only acts upon the rear wheels after acting upon the front wheels to a predetermined extent.

A further feature of the invention is provision for utilizing the mechanical power of the vehicle to assist the manual steering of the rear wheels at an accelerated rate over that of the front wheels; the employment of power assistance in steering the front wheels being wholly optional with the driver and automatically entering into the steering of the rear wheels after the normal shifting movement of the front wheels is attained.

In order that the invention may be readily understood, one operative embodiment of the same is set forth by way of illustration in the accompanying drawings, wherein Fig. 1 represents in plan the steering mechanism of an automobile moving in a right line direction;

Fig. 2 is a similar view showing the position of the mechanism when a normal turn is being made by the deflection of the front wheels only;

Fig. 3 illustrates a short turn, the rear wheels being also brought into action;

Figs. 4 and 5 are respectively sections on the lines 4—4 and 5—5 of Fig. 1; and

Figs. 6 and 7 are sections taken respectively on the lines 6—6 and 7—7 of Fig. 1.

Having reference to the drawings, the reference numeral 11 designates the side frame members of an automobile chassis, 12 the front axle and 13 the rear axle, the latter embodying the usual differential 14 and transmission shaft 15. The front and rear sets of wheels are both steerable, being provided with the usual steering knuckles and cross rods shown but not necessary to be described herein; which steering connections of both front and rear wheels are controlled by means of one steering device 16, such as the usual steering wheel and post, and acting through the usual gearing, transmission rod 17 and bell crank levers 18 and 19 as will be readily understood from an inspection of the drawings.

The present invention is not dependent upon the selection of particular mechanical transmission media for securing sequential operation of the front and rear steering devices, such being within the engineering skill of the car builder when informed as to the purpose to be served, but an illustrative example is here given of one form of mechanism operative for the purpose.

Interposed in and forming a part of the steering mechanism is here illustrated a cam 20 provided with cam slots 21 and 22, the cam being pivoted at 23 and eccentrically connected at 24 by means of a link or rod or equivalent member 25 with the bell crank lever 18, whereby the cam may be oscillated about its pivot point 23 by the rotation of the steering wheel and its connections.

The steering knuckle 26 of the front set of wheels is connected by means of a steering rod or equivalent member 27 with the cam, a wiper roll 28 carried by the steering rod 27 riding within the cam slot 21 and the steering rod 27 being guided for movement in a radial or right line direction by a slot 29 receiving the pivot 23.

Similarly, one arm 19a of the bell crank lever 19 which effects the steering of the rear wheels is connected to a steering rod 30 or equivalent transmission means which carries a wiper roll 31 riding in the cam slot 22, said steering rod being guided for movement radially of the cam or axially of the rod by means of a slot 32 receiving the pivot 23.

The relation of the parts as illustrated in the drawings is such that during the initial rotation of the cam 20 in a counterclockwise direction by the steering device 16 the wiper roll 28 will be moving towards the low point of the cam slot 21, thus retracting the steering rod 27 and deflecting the front wheels to a position of the parts as illustrated in Fig. 2 wherein the front wheels have reached the limit of their deflection and are firmly held in that position by the location of the wiper roll 28 in the extreme reach of the cam slot which constitutes a dwell portion.

Continued turning movement of the steering wheel retains the wiper roll 28 in the dwell portion of its cam slot 21 while the wiper roll 31 of the steering rod 30 extending to the rear wheels travels at a sharper inclination towards the low point of the cam slot 22, whereby the rear wheels are deflected and the parts assume the position as shown in Fig. 3 of the drawings, both the wiper rolls 28 and 31 resting within dwell portions of the cam slots.

Under normal straight-away operation of the vehicle, the wheels being in position shown in Fig. 1, the rear wheels are held securely against deflection by the engagement of the wiper roll 31 in the dwell portion of the cam slot 22, while the front wheels are radially shiftable in either direction inasmuch as the wiper roll 28 rests in an inclined portion of the cam slot 21 between the high and low portions thereof. During any ordinary turning movement as upon a gradual curve or a wide curve in a broad highway where a sweeping turn may be made, a deflecting of the front wheels will suffice and the rear wheels will retain their position parallel to the vehicle axis. If a short turn is necessary by reason of road or traffic conditions, the driver will merely continue the rotation of the steering wheel, and when the front wheels have reached the limit of their deflection, the wiper roll 31 will have reached the end of the dwell portion of the cam and will travel towards the low point thereof thereby deflecting the rear wheels as illustrated in Fig. 3 while retaining the front wheels in their deflected position as before.

It will be observed that in the preferred construction illustrated the shifting of the two sets of wheels is not simultaneous nor concurrent within the normal range of deflection of the front wheels. The front wheels reach their normal deflection limit and the rear wheels begin their deflecting movement without any interruption in the operation of the steering wheel and without any thought upon the part of the driver. But one steering wheel is operated and that operation is by a sustained turning movement by which the front wheels alone are deflected to a predetermined normal extent and thereafter, without hiatus, the rear wheels are deflected.

Herein the terms "normal" and "limit", as applied to the extent of deflection or turning movement of the front wheels, refers to their angular shifting in taking curves which can be negotiated at ordinary driving speed and not necessarily a mechanical limit of angular movement possible. At a given speed there is a safety limit to the angular relation between the front wheels and the direction of travel and this constitutes the normal limit of deflection. At very slow speeds this normal limit may coincide with the mechanical limit. Also, the term "substantial" is used to designate a deflection of the front wheels to approximately the extent permissible at normal speeds in taking easy curves, that is to say about one-half the mechanical deflection range available at a standstill or moving very slowly.

Upon a reversal of the movement to effect right line travel, the turning of the steering wheel in the opposite direction first straightens out the rear wheels and thereafter by a continued movement of the steering wheel the front wheels are brought into parallel relation to the rear wheels as indicated in Fig. 1.

It will be appreciated that the predetermined substantial extent to which the steering of the front wheels is completed before that of the rear wheels begins and also the relation of the two as to time, extent, sequence, and overlap is subject to control by the cam design adopted.

With motor vehicles of extreme length or of heavy character such as trucks and under certain road conditions, it would at times be difficult to effect steering by manual force alone. In such circumstances, wholly at the option of the driver, the mechanical power of the vehicle may be brought into play to assist the driver. Preferably after the front wheels have been deflected to the normal limit, the application of the mechanical power of the vehicle is effected automatically to deflect the rear wheels at their accelerated rate.

In Fig. 1 is illustrated one form of means for effecting an operative driving connection between the power plant of the vehicle and the steering mechanism. Here is shown a spool-like pulley 33 mounted upon the engine or transmission shaft 15, which pulley is provided with two opposed friction faces 34, 35. A counter shaft 36 is provided at one end with a beveled gear 37 in mesh with a similar gear 38 carried by the steering shaft 16 while the opposite end of the counter shaft 36 is provided with a friction head 39 in the form of a truncated cone which takes into the space between the friction faces 34 and 35 and normally out of contact with either. That end of the counter shaft adjacent the head 39 is so journaled as to provide for slight movement in a substantially horizontal plane. The head 39 can be brought into friction contact with either of the friction faces 34 or 35 of the pulley 33. Journaled in one of the side frames 11 is a rock shaft 40 to which is affixed at that end adjacent the usual clutch and accessible to the left foot of the driver a foot lever in the form of a pedal 41 while the opposite end of the rock shaft 40 has affixed thereto an arm 42 bifurcated at its end to form a yoke 43 which takes over the counter shaft 36 adjacent its head 39.

If the operator desires to utilize the power of the motor to assist in turning the steering wheel 16 he rocks the shaft 40 by means of the pedal 14 in the proper direction to bring the friction head 39 of the counter shaft 36 into contact with either of the faces 34 or 35, whereby the manual operation of the steering device is taken over in whole or in part by the mechanical power of the motor. Suitable provision may be made, as for instance, by a connection between the steering rod 30 and the counter shaft 36, whereby as the wiper roll 31 enters upon the low or high reach of its cam the friction head 39 will automatically be brought into engagement with that face of the friction pulley which will assist in the turning of the steering device.

I claim:

1. In a steering mechanism for a vehicle, the combination with front and rear angularly deflectable wheels, of a manually operable steering device connected to both the front and rear wheels, said steering connection to the front and rear wheels becoming operative in sequence in the order named, the latter following upon the completion of the former.

2. In a steering mechanism for a vehicle, the combination with front and rear angularly deflectable wheels, of a manually operable steering device connected to both the front and rear wheels, the steering connection to the rear wheels becoming operative only after a completion of the normal shifting movement of the front wheels and in one continued movement of the steering device.

3. In a steering mechanism for a vehicle, the combination with front and rear angularly deflectable wheels, of a manually operable steering device connected to both the front and rear wheels, the steering connection of the rear wheels becoming operative only upon completion of the normal deflection range of the front wheels and in one continued movement of the steering device.

4. In a steering mechanism for a vehicle, the combination with front and rear angularly deflectable wheels, of a manually operable steering wheel, connections between the steering wheel and the front and rear sets of vehicle wheels, the connection with one set of wheels actuated during the initial rotation of the steering wheel and the connection with the other set of wheels actuated after the attainment of a predetermined substantial steering effect on the first set of wheels and by a sustained continued rotation of the steering wheel.

5. In a steering mechanism for a vehicle, the combination with front and rear angularly deflectable wheels, of a manually operable steering wheel, connections between the steering wheel and the front and rear sets of vehicle wheels, the connection with the front wheels actuated during the initial rotation of the steering wheel and the connection with the rear wheels actuated after the attainment of more than one-half the steering effect on the front wheels and by a sustained continued rotation of the steering wheel.

6. In a steering mechanism for vehicles, a steering device with connections to both the front and rear wheels, the connection to the rear wheels becoming operative at an accelerated rate after the completion of the steering effect upon the front wheels to a predetermined extent, the steering connection to the front and rear wheels being accomplished in one sustained movement of the steering device.

7. In a steering mechanism for a vehicle, a manually operable steering wheel, connections between the steering wheel and the front and rear sets of vehicle wheels, the connection with one set of wheels actuated during the initial rotation of the steering wheel and the connection with the other set of wheels actuated after the attainment of a predetermined steering effect on the first set of wheels and by a sustained continued rotation of the steering wheel, the deflection of the rear wheels being at an accelerated rate.

8. In a steering mechanism for vehicles, a manually operable steering device connected to both the front and rear wheels of a vehicle, said connection to the front and rear wheels becoming operative in sequence in the order named, and means for automatically connecting the steering mechanism with the power of the vehicle during the steering of the rear wheels whereby to assist in the manual operation.

9. In a steering mechanism for a vehicle, the combination with front and rear angularly deflectable wheels, of a manually operable steering device connected to both the front and rear wheels, said steering connections to the front and rear wheels completing their operation thereon in sequence in the order named, and means for optionally connecting the manually operable steering mechanism with the power of the vehicle whereby to assist in the manual operation.

10. In a steering mechanism for a vehicle, a manually operable steering wheel, connections between the steering wheel and the front and rear sets of vehicle wheels, the connection with one set of wheels actuated during the initial rotation of the steering wheel and the connection with the other set of wheels actuated after the attainment of a predetermined steering effect on the first set of wheels and by a sustained continued rotation of the steering wheel, the deflection of the other wheels being at an accelerated rate, and means for connecting the manually operable steering mechanism with the power of the vehicle during the accelerated deflection of the rear wheels.

11. In a steering mechanism for vehicles, a manually rotatable steering wheel, steering rods connected to the front and rear wheels at one end, means for converting the rotary movement of the steering wheel into substantially right line movement of the steering rods, the action of the converting means upon the steering rods of the front and rear wheels being sequential whereby the front wheels are deflected while the rear wheels remain fixed and the front wheels subsequently remain fixed while the rear wheels are deflected.

12. In a steering mechanism for vehicles, a manually operable steering wheel, a cam rotatable by said steering wheel, steering rods connected to the front and rear wheels at one end and engaging the cam at the other, the initial rotation of the cam having a radial action on the front wheel steering rod and a dwell relation to the rear wheel steering rod, and the sequential rotation of the cam having a dwell relation to the front wheel steering rod and an accelerated radial action on the rear wheel steering rod, whereby the rear wheels are held in a fixed plane during the deflection of the front wheels and are thereafter deflected at an accelerated rate while the front wheels are fixed in their deflected plane.

LEWIS T. GREIST.

CERTIFICATE OF CORRECTION.

Patent No. 1,951,147.  March 13, 1934.

LEWIS T. GREIST.

It is hereby certified that error appears in the printed specification of the above numbered patent requiring correction as follows: Page 2, line 33, after "deflected" insert at an accelerated rate; line 54, before the word "limit" insert normal; and that the said Letters Patent should be read with these corrections therein that the same may conform to the record of the case in the Patent Office.

Signed and sealed this 24th day of April, A. D. 1934.

Bryan M. Battey

Acting Commissioner of Patents.

(Seal)